Wallace & Carpenter.
Revolving Rake.

Nº 40782. Patented Dec. 1, 1863.

Witnesses. Jno Wallace Inventors. D. Carpenter
By Munn & Co. By Munn & Co.

UNITED STATES PATENT OFFICE.

JOHN WALLACE AND DANIEL CARPENTER, OF GOSHEN, NEW YORK.

IMPROVEMENT IN HAY-RAKES.

Specification forming part of Letters Patent No. 40,782, dated December 1, 1863.

*To all whom it may concern:*

Be it known that we, JOHN WALLACE and DANIEL CARPENTER, both of Goshen, in the county of Orange and State of New York, have invented a new and useful Improvement in Horse-Rakes; and we do hereby declare that the following is a full, clear, and exact description of the same, reference being had to the accompanying drawings, forming a part of this specification, in which—

Figure 1:
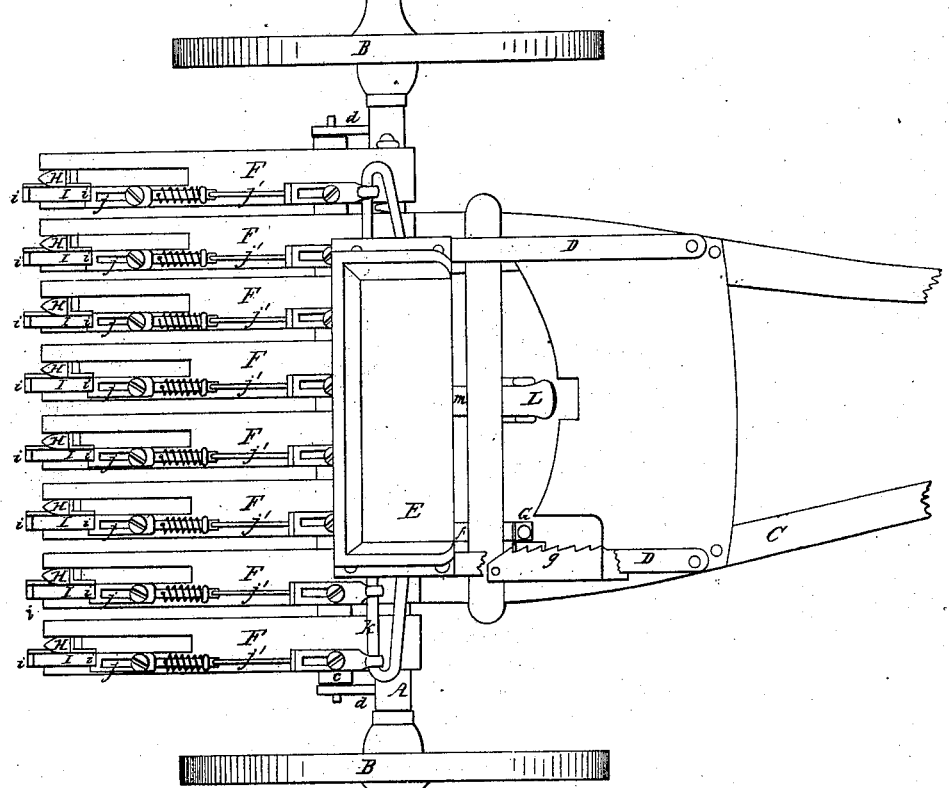
Figure 2:
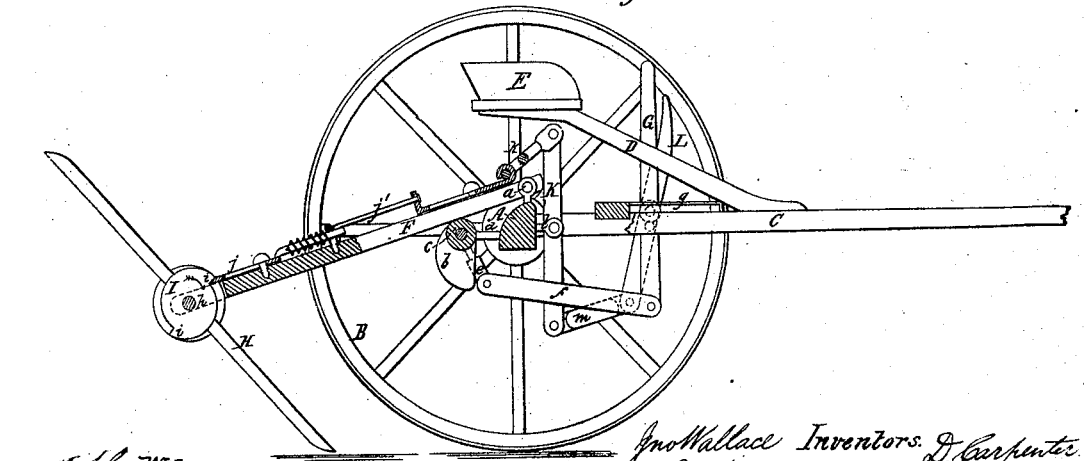

Figure 1 represents a plan or top view of our invention. Fig. 2 is a longitudinal vertical section of the same.

Similar letters of reference in both views indicate corresponding parts.

This invention relates to a horse-rake in which a series of independent revolving teeth are employed, each tooth being secured to an independent hinged arm and provided with a double notched or shouldered cam and spring-catch in such a manner that each tooth is perfectly free to accommodate itself to the sinuosities or unevenness of the ground, and the several teeth can be discharged simultaneously by withdrawing the spring-catches, and after having made one-half a revolution stopped or retained in the proper working position by throwing the catches into the second notches or shoulders.

To enable those skilled in the art to make and use our invention, we will proceed to describe it.

A represents the axle of our horse rake, which is supported by two wheels, B.

C are the thills, which are mortised or otherwise secured in the front side of the axle, and from which rise two curved standards, D, that support the driver's seat E.

F are a series of arms, which extend from the axle A in a direction opposite to the thills, being hinged to a rod, *a*, that is secured to the top of the axle. Each of these arms rises and falls, one independent of the other, so that they can adjust themselves to the inequalities of the ground, and they rest upon cams *b*, secured to a rock-shaft, *c*, that has its bearings in standards *d*, projecting from the rear side of the axle A. This shaft is provided with a lever, G, in front of the driver's seat. This lever is adjustable by a serrated bar, *g*, and according to the position given to said lever the arms are raised from or lowered to the ground as much as may be desired.

Each of the arms F is provided with a revolving tooth, H, being secured at about the middle of its length to a cam, I, which rotates on a pin, *h*, inserted in the forked end of the arm. Each cam is provided with two shoulders, *i*, one opposite the other, and a spring-dog, *j*, by coming in contact with one of these shoulders, prevents the cam from rotating in the direction of the arrow marked upon it in Fig. 2. The spring-dogs *j* are attached to the tops of the arms F, and they connect by hooked bars *j* and a looped rod, *k*, with a lever, K, which has its fulcrum in standards *l*, projecting from the front side of the axle. This lever connects by a link, *m*, with a hand or foot lever, L, that is in a convenient position to be reached from the driver's seat. As the rake is drawn along on the field the hay collects upon the teeth, and when it is desired to discharge the load the hand-lever L is pressed forward. By this action all the spring-dogs *j* are withdrawn simultaneously from the shoulders *i*, and the cams, with the teeth, are allowed to revolve until the opposite shoulders of said cams strike the spring-dogs, bringing the opposite points of the teeth in working position. By attaching each tooth to a separate hinged arm it is allowed to accommodate itself to the unevenness of the ground and to pass over any obstruction which it may meet without disturbing the adjoining teeth.

If one of the teeth should break, it can readily be replaced, and the manner of operating the rake and of discharging the load is very simple.

We do not claim as our invention the use of revolving teeth in a horse-rake; but,

Having thus described our invention, what we do claim, and desire to secure by Letters Patent, is—

The arrangement of the double-shouldered cams I and spring-dogs, in combination with the teeth H and hinged arms F, constructed and operating in the manner and for the purpose substantially as specified.

JOHN WALLACE.
DANIEL CARPENTER.

Witnesses:
H. W. ELLIOTT,
B. M. CLARK.